(12) United States Patent
Lehtiniemi et al.

(10) Patent No.: US 10,628,017 B2
(45) Date of Patent: Apr. 21, 2020

(54) HOVERING FIELD

(71) Applicant: Nokia Technologies Oy, Espoo (FI)

(72) Inventors: Arto Lehtiniemi, Lempaala (FI); Antti Eronen, Tampere (FI); Juha Arrasvuori, Tampere (FI); Jukka Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 14/900,657

(22) PCT Filed: Jun. 24, 2014

(86) PCT No.: PCT/FI2014/050503
§ 371 (c)(1),
(2) Date: Dec. 22, 2015

(87) PCT Pub. No.: WO2014/207306
PCT Pub. Date: Dec. 31, 2014

(65) Prior Publication Data
US 2016/0154577 A1    Jun. 2, 2016

(30) Foreign Application Priority Data

Jun. 28, 2013 (EP) .................................. 13174300

(51) Int. Cl.
*G06F 3/0484* (2013.01)
*G06F 3/0488* (2013.01)
*G06F 3/041* (2006.01)
*G06F 3/16* (2006.01)

(52) U.S. Cl.
CPC .......... *G06F 3/04847* (2013.01); *G06F 3/041* (2013.01); *G06F 3/04845* (2013.01); *G06F 3/04883* (2013.01); *G06F 3/04886* (2013.01); *G06F 3/165* (2013.01); *G06F 2203/04108* (2013.01)

(58) Field of Classification Search
CPC .. G06F 3/041; G06F 3/04845; G06F 3/04847; G06F 3/04883; G06F 3/04886; G06F 3/165
See application file for complete search history.

(56) References Cited

U.S. PATENT DOCUMENTS

| 5,086,385 | A   |   | 2/1992  | Launey et al. ................. 364/188 |
| 5,694,150 | A   | * | 12/1997 | Sigona ..................... G06F 3/038 715/856 |
| 8,060,841 | B2  | * | 11/2011 | Boillot ..................... G06F 3/017 715/863 |
| 8,391,719 | B2  | * | 3/2013  | Alameh .............. H04M 1/7253 398/115 |

(Continued)

OTHER PUBLICATIONS

Henderson, et al., "Opportunistic Tangible User Interfaces for Augmented Reality," Visualization and Computer Graphics, IEEE transactions on, vol. 16, No. 1, pp. 4-16, 2010 (Year: 2010).*

*Primary Examiner* — Justin R. Blaufeld
(74) *Attorney, Agent, or Firm* — Harrington & Smith

(57) ABSTRACT

An apparatus, method, and computer program product for: associating a first item with a first portion of a hovering field, the hovering field at least partially encompassing a device, providing a first virtual item representative of the first item and controlling spatial audio in dependence on a position of the first virtual item.

12 Claims, 8 Drawing Sheets

(56) References Cited

U.S. PATENT DOCUMENTS

| | | | |
|---|---|---|---|
| 8,953,889 B1* | 2/2015 | Worley, III | G06T 19/006 382/190 |
| 9,245,485 B1* | 1/2016 | Hu | G09G 3/3611 |
| 9,721,386 B1* | 8/2017 | Worley, III | G06T 19/006 |
| 2005/0110773 A1* | 5/2005 | Chapman | G06F 3/0346 345/174 |
| 2005/0275636 A1* | 12/2005 | Dehlin | G06F 3/011 345/173 |
| 2006/0026521 A1* | 2/2006 | Hotelling | G06F 3/0418 715/702 |
| 2007/0118814 A1* | 5/2007 | Greer | G06F 3/0482 715/810 |
| 2007/0125633 A1* | 6/2007 | Boillot | G06F 3/017 200/52 R |
| 2007/0126696 A1* | 6/2007 | Boillot | G06F 3/017 345/156 |
| 2007/0211023 A1* | 9/2007 | Boillot | G06F 3/017 345/156 |
| 2009/0254843 A1* | 10/2009 | Van Wie | H04L 12/1822 715/757 |
| 2010/0033479 A1* | 2/2010 | Hirayama | G06F 3/0325 345/419 |
| 2010/0073404 A1* | 3/2010 | Brown | G06F 3/04895 345/634 |
| 2010/0107099 A1* | 4/2010 | Frazier | G06F 3/044 715/765 |
| 2010/0297946 A1* | 11/2010 | Alameh | H04M 1/7253 455/41.3 |
| 2011/0093778 A1* | 4/2011 | Kim | G06F 3/041 715/702 |
| 2011/0209104 A1* | 8/2011 | Hinckley | G06F 3/0416 715/863 |
| 2011/0285665 A1* | 11/2011 | Matsumoto | G06F 3/044 345/174 |
| 2011/0316790 A1* | 12/2011 | Ollila | G06F 3/04883 345/173 |
| 2012/0013613 A1* | 1/2012 | Vesely | G06F 3/011 345/419 |
| 2012/0062442 A1* | 3/2012 | Locker | G06F 3/1446 345/1.3 |
| 2012/0062475 A1* | 3/2012 | Locker | G06F 3/041 345/173 |
| 2012/0072853 A1* | 3/2012 | Krigstrom | G06F 3/0486 715/748 |
| 2012/0086727 A1* | 4/2012 | Korah | G06F 3/03 345/633 |
| 2012/0102436 A1* | 4/2012 | Nurmi | G06F 1/1613 715/863 |
| 2012/0154267 A1* | 6/2012 | Albano | G06F 3/0346 345/156 |
| 2012/0206319 A1* | 8/2012 | Lucero | H04N 21/4788 345/1.3 |
| 2012/0210349 A1* | 8/2012 | Campana | G06F 3/147 725/32 |
| 2012/0237053 A1* | 9/2012 | Alam | H04L 12/00 381/80 |
| 2012/0242596 A1* | 9/2012 | Sip | G06F 3/04883 345/173 |
| 2012/0249741 A1* | 10/2012 | Maciocci | G06F 3/011 348/46 |
| 2012/0250071 A1* | 10/2012 | Miller | G06F 3/1205 358/1.15 |
| 2012/0256954 A1* | 10/2012 | Soon-Shiong | A63F 13/65 345/633 |
| 2012/0262398 A1* | 10/2012 | Kim | G06F 3/041 345/173 |
| 2012/0280898 A1* | 11/2012 | Lucero | G06F 3/1446 345/156 |
| 2012/0324396 A1* | 12/2012 | Baartman | G06F 9/451 715/788 |
| 2013/0027321 A1* | 1/2013 | Chen | G06F 3/04883 345/173 |
| 2013/0085705 A1* | 4/2013 | Jano | H04M 1/0208 702/127 |
| 2013/0178257 A1* | 7/2013 | Langseth | G06T 17/05 463/4 |
| 2013/0205131 A1* | 8/2013 | Lee | H04M 1/72522 713/100 |
| 2013/0231762 A1* | 9/2013 | Cho | H04M 1/72533 700/94 |
| 2013/0241954 A1* | 9/2013 | Yu | G06F 3/1446 345/629 |
| 2013/0265218 A1* | 10/2013 | Moscarillo | G06F 3/017 345/156 |
| 2013/0343601 A1* | 12/2013 | Jia | G06K 9/00355 382/103 |
| 2014/0119581 A1* | 5/2014 | Tsingos | H04S 7/307 381/300 |
| 2014/0129937 A1* | 5/2014 | Jarvinen | G06F 3/0487 715/716 |
| 2014/0177396 A1* | 6/2014 | Lee | G06F 3/04886 368/10 |
| 2014/0282282 A1* | 9/2014 | Holz | G06F 3/017 715/863 |
| 2014/0313103 A1* | 10/2014 | Goel | G06F 3/1423 345/2.2 |
| 2014/0313408 A1* | 10/2014 | Sharma | G06F 3/1423 348/383 |
| 2014/0315489 A1* | 10/2014 | Lee | G06F 3/1454 455/41.2 |
| 2014/0325455 A1* | 10/2014 | Tobin | G06F 3/04815 715/850 |
| 2014/0327628 A1* | 11/2014 | Tijssen | G06F 3/0488 345/173 |
| 2014/0333667 A1* | 11/2014 | Jung | G06T 11/00 345/633 |
| 2015/0040074 A1* | 2/2015 | Hofmann | G06T 19/006 715/852 |
| 2015/0146007 A1* | 5/2015 | Dusik | G06K 9/00671 348/161 |
| 2015/0199063 A1* | 7/2015 | Algreatly | G06F 3/04815 348/169 |
| 2015/0363070 A1* | 12/2015 | Katz | G06F 3/017 715/852 |
| 2017/0364234 A1* | 12/2017 | Ligameri | G06F 3/0489 |

* cited by examiner

HOVERING FIELD

TECHNICAL FIELD

The present application relates generally to providing a hovering field.

BACKGROUND

A user may input information into and receive information from electronic devices in many different ways. For example, a user may input information using a keyboard, a mouse, a touch screen and the like. As another example, a user may receive information from an electronic device via a display, a loudspeaker and the like.

SUMMARY

Various aspects of examples of the invention are set out in the claims.

According to a first aspect of the present invention, there is provided a method comprising associating a first item with a first portion of a hovering field, the hovering field at least partially encompassing a device and associating a second item with a second portion of the hovering field, wherein the relative positions of the first portion and the second portion correspond to the relative positions of the first item and the second item in a data structure.

According to a second aspect of the present invention, there is provided an apparatus comprising a processor, memory including computer program code, the memory and the computer program code configured to, working with the processor, cause the apparatus to perform at least the following: associate a first item with a first portion of a hovering field, the hovering field at least partially encompassing a device and associate a second item with a second portion of the hovering field, wherein the relative positions of the first portion and the second portion correspond to the relative positions of the first item and the second item in a data structure.

In at least one example embodiment, the first portion comprises a first layer and the second portion comprises a second layer.

In at least one example embodiment the second layer is enclosed by the first layer.

In at least one example embodiment the first portion comprises a first zone and the second portion comprises a second zone.

In at least one example embodiment at least one of the first portion and the second portion extends from a first side of the device to a second side of the device.

In at least one example embodiment the memory and the computer program code are configured to, with the processor, define the center point of the device as the center point of the hovering field.

In at least one example embodiment the memory and the computer program code are configured to, with the processor, define the center point of a side as the center point of the hovering field.

In at least one example embodiment the memory and the computer program code are configured to, with the processor, in response to receiving a user input, rotate a portion of the hovering field by changing the position of the first item relative to the second item in the hovering field.

In at least one example embodiment changing the position of the first item relative to the second item comprises changing the position in the hovering field without changing the position in the file structure.

In at least one example embodiment the memory and the computer program code are configured to, with the processor, receive an indication of an instruction to change a position of the first portion relative to the second portion of the hovering field and cause an action to be performed.

In at least one example embodiment the user input comprises at least one of a hovering gesture input and a facial expression.

In at least one example embodiment the memory and the computer program code are configured to, with the processor, change the position of the first item along a trajectory corresponding to a shape of the hovering field.

In at least one example embodiment the memory and the computer program code are configured to, with the processor, detect a portion of a first hovering field that is in common with a second hovering field and detect an item comprised by the detected portion of the first hovering field.

In at least one example embodiment the memory and the computer program code are configured to, with the processor, share the item with a device causing the second hovering field.

In at least one example embodiment the hovering field comprises a visible hovering field.

According to a third aspect of the present invention, there is provided a computer program product comprising a computer-readable medium bearing computer program code embodied therein for use with a computer, the computer program code comprising code for associating a first item with a first portion of a hovering field, the hovering field at least partially encompassing a device and code for associating a second item with a second portion of the hovering field, wherein the relative positions of the first portion and the second portion correspond to the relative positions of the first item and the second item in a data structure.

According to a fourth aspect of the present invention there is provided an apparatus, comprising means for associating a first item with a first portion of a hovering field, the hovering field at least partially encompassing a device and means for associating a second item with a second portion of the hovering field, wherein the relative positions of the first portion and the second portion correspond to the relative positions of the first item and the second item in a data structure.

According to a fifth aspect of the present invention, there is provided a method comprising: associating a first item with a first portion of a hovering field, the hovering field at least partially encompassing a device, providing a first virtual item representative of the first item and controlling spatial audio in dependence on a position of the first virtual item associated with the first portion of the hovering field.

According to a sixth aspect of the present invention, there is provided an apparatus comprising: a processor, memory including computer program code, the memory and the computer program code configured to, working with the processor, cause the apparatus to perform at least the following: associate a first item with a first portion of a hovering field, the hovering field at least partially encompassing a device; provide a first virtual item representative of the first item; and control spatial audio in dependence on a position of the first virtual item associated with the first portion in the hovering field.

In at least one example embodiment the first virtual item comprises an audio item representing audio.

In at least one example embodiment the memory and the computer program code are further configured to, with the processor, detect the position of the audio item relative to a user and select a first loudspeaker in dependence on the detected position.

In at least one example embodiment the memory and the computer program code are configured to, with the processor, cause routing of the audio represented by the audio item through the first loudspeaker.

In at least one example embodiment the memory and the computer program code are configured to, with the processor, re-position the audio item wherein re-positioning the audio item causes re-routing the audio represented by the audio item through a second loudspeaker.

In at least one example embodiment the first portion of the hovering field comprises a rotatable layer.

In at least one example embodiment the memory and the computer program code are configured to, with the processor, associate an audio parameter with the first portion of the hovering field.

In at least one example embodiment the audio parameter comprises an audio equalizer setting.

In at least one example embodiment the memory and the computer program code are configured to, with the processor, adjust the audio parameter in response to rotating the layer.

According to a seventh aspect of the present invention, there is provided a computer program product comprising a computer-readable medium bearing computer program code embodied therein for use with a computer, the computer program code comprising code for associating a first item with a first portion of a hovering field, the hovering field at least partially encompassing a device, code for providing a first virtual item representative of the first item and code for controlling spatial audio in dependence on a position of the first virtual item associated with the first portion in the hovering field.

According to an eight aspect of the present invention there is provided an apparatus, comprising means for associating a first item with a first portion of a hovering field, the hovering field at least partially encompassing a device, means for providing a first virtual item representative of the first item and means for controlling spatial audio in dependence on a position of the first virtual item.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and its potential advantages are understood by referring to FIGS. 1 through 11 of the drawings.

According to an example embodiment there is provided a hovering field at least partially encompassing a device. The hovering field may comprise one or more portions to which items may be associated. A portion may comprise, for example, a rotatable layer or a zone. The hovering field may be used for, for example, spatially expanding a data structure, sharing an item based on an overlapping hovering field, controlling spatial audio or adjusting parameter values.

In the examples below, an overlapping hovering field comprises a portion of a first hovering field that is in common with a second hovering field. The first hovering field may be provided by a first apparatus and the second hovering field may be provided by a second apparatus.

In the examples below, spatial audio comprises spatially positioning sound objects such as sound tracks in a three dimensional (3D) space by passing sound tracks through a sound-rendering system and reproducing the sound tracks through multiple transducers distributed around listening space. In this way, a spatial audio field may be provided to create an impression that sound is being generated from sound sources placed in multiple locations in the listening space. Spatial audio may be provided using different techniques such as loudspeaker stereophony, binaural technology or reconstruction using synthesis of the natural wave field.

Figure 1:
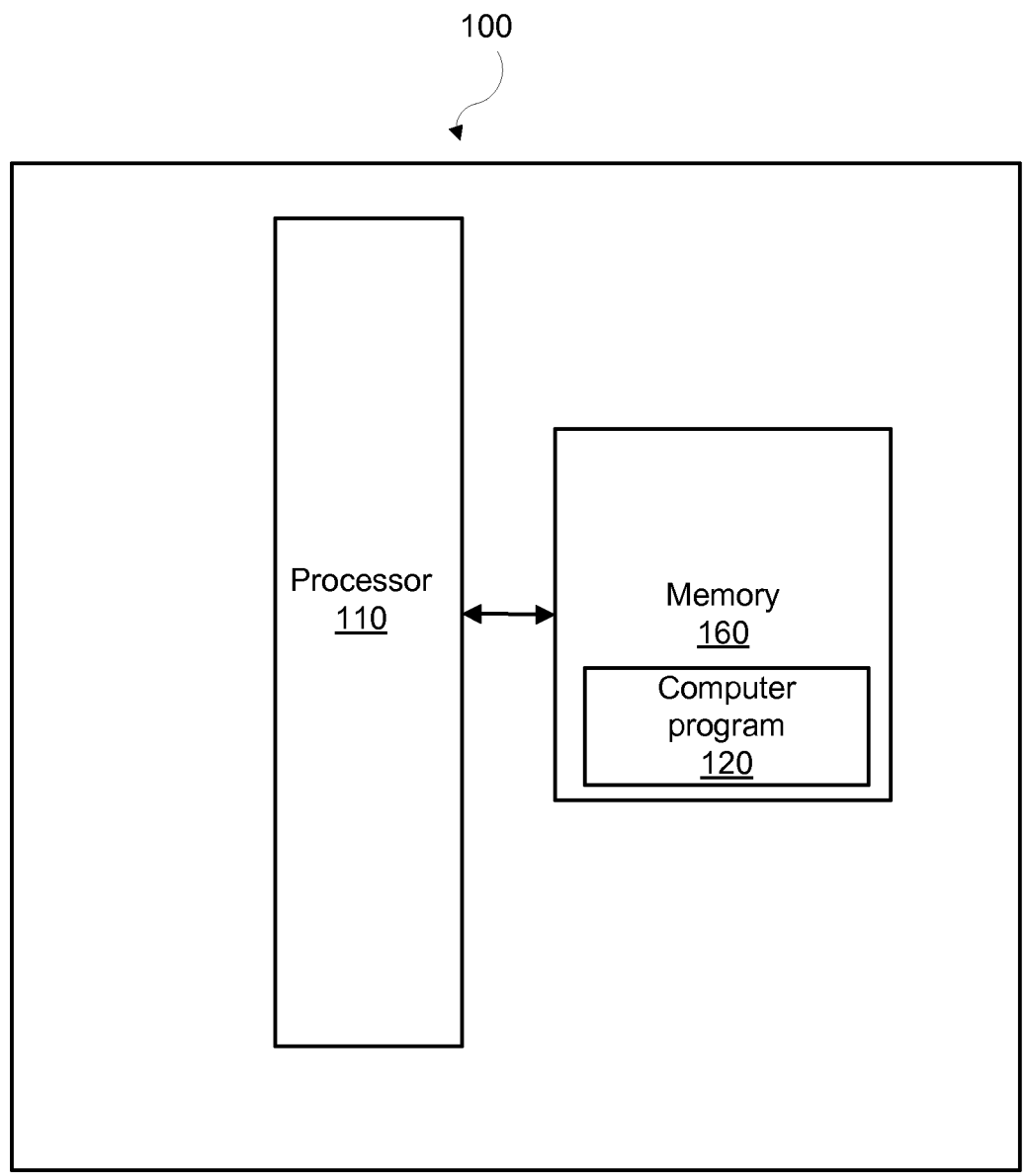
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may, for example, be an electronic device such as a chip or a chip-set. The apparatus 100 includes a processor 110 and a memory 160. In other examples, the apparatus 100 may comprise multiple processors.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus.

The memory 160 stores computer program instructions 120 which when loaded into the processor 110 control the operation of the apparatus 100 as explained below. In other examples, the apparatus 100 may comprise more than one memory 160 or different kinds of storage devices.

Computer program instructions 120 for enabling implementations of example embodiments of the invention or a part of such computer program instructions may be loaded onto the apparatus 100 by the manufacturer of the apparatus 100, by a user of the apparatus 100, or by the apparatus 100 itself based on a download program, or the instructions can be pushed to the apparatus 100 by an external device. The computer program instructions may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
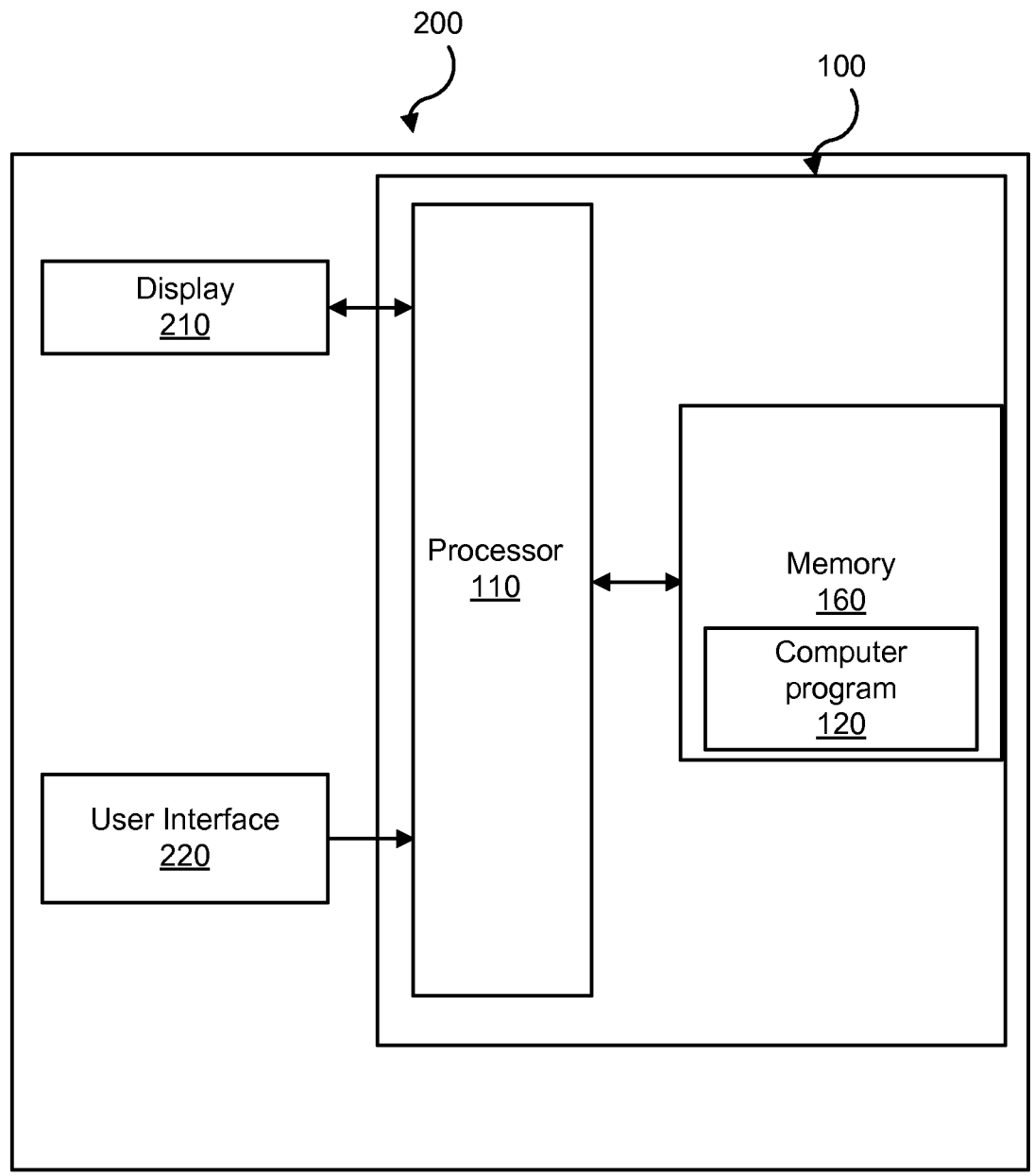
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a CD-DVD or Blu-ray player, or a media player. The apparatus 200 may also be, or be comprised in, a household appliance such as a refrigerator, a coffee maker, or any other suitable device such as a dashboard in a car. In the examples of FIGS. 2 and 3 it is assumed that the apparatus 200 is a mobile computing device.

In this example, the mobile computing device 200 is illustrated as comprising the apparatus 100, a display 210 and a user interface 220. However, the display 210 and/or user interface 220 may be external to the apparatus 200 but in communication with it. In some examples the display 210 may be incorporated into the user interface 220: for example, the user interface 220 may include a touch screen display.

In the example of FIG. 2 the user interface 220 is configured to enable inputting and accessing information in the mobile computing device 200. According to an example embodiment, the user interface 220 comprises a surface capable of receiving user inputs. The surface may be an input surface such as a touch screen or a touch pad. In some example embodiments, the mobile computing device 200 may include both a touch screen and a touch pad or multiple surfaces capable of receiving user inputs. A touch screen may be configured not only to enable accessing and/or inputting information but also to display user interface objects, while a touch pad may be configured to enable accessing and/or inputting information and a separate display may be provided. In some example embodiments, no display is provided. A user may input and access information by using a suitable input means such as a pointing means, one or more fingers, a stylus or a digital pen.

In an example embodiment, inputting and accessing information is performed by touching the surface such as the surface of a touch screen display 210 or a touch pad. Additionally or alternatively, proximity of an input means such as a finger or a stylus may be detected and inputting and accessing information may be performed by hovering the finger or the stylus over the surface. In a further example embodiment the surface may be a multi-touch surface configured to detect multiple at least partially concurrent touches on the surface.

A touch screen or a touch pad may be based on one or more of several different technologies. For example, different touch screen and pad technologies include resistive, capacitive, Surface Acoustic Wave (SAW), infrared, strain gauge, optical imaging, dispersive signal technology and acoustic pulse recognition touch screens. A touch screen or a touch pad may also operate using a combination of different technologies.

Additionally or alternatively, the user interface 220 may comprise a manually operable control such as a button, a key, a joystick, a stylus, a pen, a roller, a rocker, a keypad, a keyboard or any suitable input mechanism for inputting and/or accessing information. Further examples include a microphone, a speech recognition system, eye movement recognition system, acceleration-, tilt- and/or movement-based input systems.

Referring back to the example of FIG. 2, in addition to a display, the mobile computing device 200 may include another kind of an output device such as a tactile feedback system for presenting tactile and/or haptic information for a user. The tactile feedback system may be configured to receive control signals provided by the processor 110. The tactile feedback system may be configured to indicate a completed operation or to indicate selecting an operation, for example. In an example embodiment a tactile feedback system may cause the mobile computing device 200 to vibrate in a certain way to inform a user of an activated and/or completed operation.

Example embodiments relate to user operations in a hovering field.

The hovering field may be provided by the apparatus 100, a separate module included in the mobile computing device 200, or a chip or a chipset communicating with the apparatus 100. The hovering field may be provided based on different technologies such as capacitive sensing, image sensors or a combination thereof. In the hovering field a user may input user inputs without a direct contact with the mobile computing device 200 or the apparatus 100 by means of one or more physical gestures that are detectable within the hovering field by the apparatus 100.

Figure 3A:
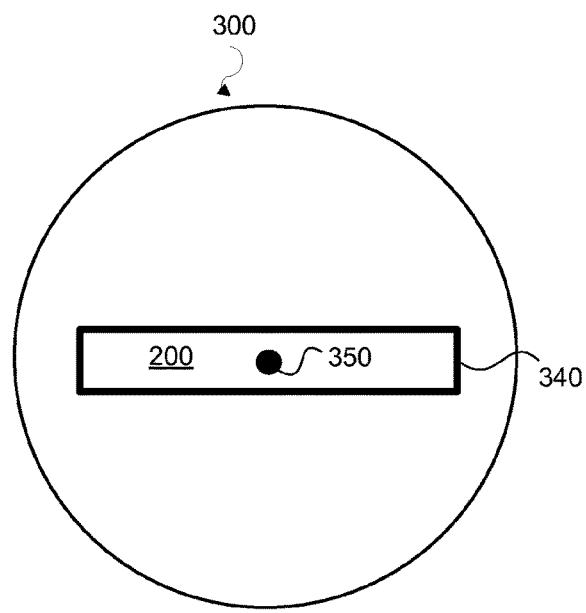
FIGS. 3a to 3c illustrate hovering fields in accordance with an example embodiment of the invention.

The shape of the hovering field may be determined by appropriately selecting one or more reference points for the hovering field. In the example of FIG. 3a, the apparatus 100 is configured to define the center point of the mobile computing device 200 as the reference point 350 for the hovering field. In this way, the apparatus 100 is configured to define a three dimensional input area for receiving hovering inputs, the three dimensional input area comprising a shape of a sphere.

Figure 3B:
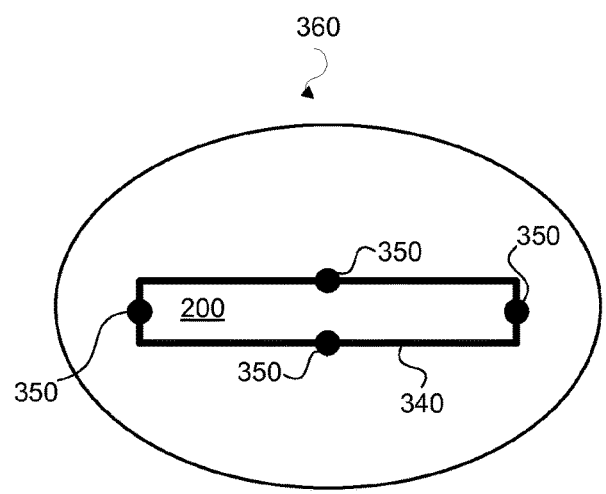

As another example, multiple reference points for the hovering field may be defined. FIG. 3b illustrates an embodiment where the apparatus 100 is configured to define the center point of each side as the reference point for the hovering field. In this way, the apparatus 100 is configured to define a three dimensional input area for receiving hovering inputs. The three dimensional input area in this example comprises a shape of an ellipsoid. It should be noted that even though a spherical and an elliptical hovering field is illustrated in the examples of FIGS. 3a and 3b, respectively, also other shapes or a combination of different shapes may be provided by appropriately selecting one or more reference points for the hovering field. For example, the apparatus 100 may be configured to define the center point of a side of the mobile computing device 200 as a first reference point of the hovering field 350 and the center point of the mobile computing device as a second reference point of the hovering field 350.

User inputs in a hovering field may be detected by a hover sensor surface. The hover sensor surface may comprise, for example, an array of sensors providing a hovering field. The hover sensor surface is configured to detect an object hovering over the surface. As another example, the hover sensor surface may comprise, for example, flexible film material 340 wrapped around the mobile computing device 200 in order to provide a hovering field on each side of the mobile computing device 200. As a further example, the mobile computing device 200 may be made of a flexible material wherein the hover sensor surface is integrated.

According to an example embodiment, the apparatus 100 is configured to associate a first item with a first portion of the hovering field. Associating a first item with a first portion of a hovering field may comprise providing by the apparatus 100 a virtual first item representing an item stored in the mobile computing device 200 or a server. The virtual item is selectable by a user by selecting the first portion in the hovering field. The apparatus 100 is configured to select the item stored in the mobile computing device 200/server in response to selecting the virtual item, the virtual item being representative of the item stored in the mobile computing device 200/server. According to an example embodiment, a virtual item in a hovering field provided by an apparatus 100 and comprised by a mobile computing device 200 may be a representative of an item stored on a server. In other words, the hovering field at least partially encompassing the mobile computing device 200 may be used as an interface for accessing items on a server.

The apparatus 100 may also be configured to associate a second item with a second portion of the hovering field. Similarly to associating a first item with a first portion of the hovering field, associating a second file with a second portion of a hovering field may comprise providing by the apparatus 100 a virtual second item representative of a second item stored in the mobile computing device 200/server and being selectable by a user by selecting the second portion in the hovering field. The relative positions of the first portion and the second portion may correspond to the relative positions of the first item and the second item in a data structure. The data structure may be comprised by the mobile computing device 200 or a server. The data structure may comprise a file structure such as a hierarchical structure comprising parent nodes and child nodes. In an example embodiment, the first file is a song and the second file is a music album comprising the song.

The first item and/or the second item may comprise, for example, a data item such as a file, a folder, a data structure or portion of a data structure, selectable items within a menu system, or the like. A file may comprise any suitable file such as a media file, a picture file, a text file or the like.

Without limiting the scope of the claims, an advantage of associating one or more files with a hovering field may be that a file structure is spatially expanded and selecting items in the file structure may be easier for the user.

According to an example embodiment, a hover sensor surface is provided on the mobile computing device 200 and the apparatus 100 is operatively connected to the hover sensor surface. The apparatus 100 is configured to receive information about the selecting object within the hovering field, detected by the hover sensor surface. The apparatus 100 is further configured to receive an indication of a distance between the reference point and the selecting object and/or receive an indication of coordinate data of the selecting object.

According to an example embodiment, an item associated with a portion of the hovering field may be selected by selecting a virtual item representative of an item stored in the mobile computing device 200/server based on three dimensional (3D) coordinate data such as X, Y and Z coordinate data. In this example, Z coordinate data represents the depth dimension of the hovering field. X and Y coordinate data represent a target point or a target area on the hover sensor surface. For example, a target point or a target area may comprise a point or an area, respectively, on the hover sensor surface that is selected by the selecting object when Z coordinate data of the selecting object is zero (e.g. when the selecting object touches the hover sensor surface). The apparatus 100 is configured to select the item associated with a portion of the hovering field when the X, Y and Z coordinate data of the selecting object correspond to X, Y and Z coordinate data of the virtual item representative of the item stored in the mobile computing device 200/server.

According to another example embodiment, a portion of the hovering field may be selected based on a distance between a selecting object (e.g. a finger, a stylus or a digital pen) and a reference point for the hovering field. For example, if the hovering field comprises multiple portions such as layers, a portion may be selected based on the distance between a selecting object and a reference point. It should be noted that, if an item associated with a portion of the hovering field corresponds to a whole layer, the virtual item representative of the item stored in the mobile computing device 200/server may be selected solely based on the distance between the selecting object and the reference point. The apparatus 100 is configured to select the portion of the hovering field when the distance between the selecting object and the reference point correspond to a distance between the layer and the reference point. Therefore, the apparatus 100 may be configured to select an item associated with a portion of the hovering field and/or a portion of the hovering field based on X, Y or Z coordinate data, a distance between a selecting object and a reference point, or any combination thereof.

The origin of the X, Y and Z coordinate axes may comprise a reference point for the hovering field. In some examples, the apparatus 100 may be configured to define multiple origins if multiple reference points for the hovering field are provided. Hence, the apparatus 100 may be configured to receive an indication of a three dimensional (3D) hovering gesture.

According to an example embodiment, the apparatus 100 may be configured to select an item stored in the mobile computing device 200/server in response to receiving an indication that a user has selected a portion with which the item is associated. On the other hand, the apparatus 100 may be configured to select a portion of the hovering field in response to receiving an indication that a user has selected a portion of the hovering field with which no item is associated.

Without limiting the scope of the claims, an advantage of selecting a portion based on a distance between a selecting object and the mobile computing device 200 may be that a user does not need to go through complex menu, file or other data structures to select an item, but the user may directly select a desired portion. For example, when using a traditional file system, a user may need to browse through multiple menu levels by selecting consecutive menu levels one after another to be able to select a desired item. In other words, several user inputs may be required until the desired item can be selected. However, using a hovering field, a user may browse through multiple menu levels by varying the distance between the selecting object and the reference point.

According to an example embodiment, the apparatus 100 is configured to move a virtual item representative of an item stored in the mobile computing device 200/server in the hovering field in response to receiving a user input. Moving may comprise, for example, moving the virtual item from a first portion to a second portion. Moving the virtual item from a first portion to a second portion may comprise dissociating the item stored in the mobile computing device 200/server from the first portion and associating the item with the second portion. Moving the virtual item within the hovering field may or may not cause a corresponding movement of the item stored in the mobile computing device 200/server. According to an example embodiment, the apparatus 100 is configured to change the position of the first virtual item relative to the second virtual item without changing the position of the first item in a data structure. In other words, changing the positions of virtual items may not change the physical positions of the items stored in a data structure, but only the virtual positions in the hovering field.

According to an example embodiment, the apparatus 100 is configured to change a position of a first portion relative to a second portion. For example, in the example of FIG. 4b, if the first portion comprises a first layer 310 and the second portion comprises a second layer 320, the first layer 310 may be rotated relative to the second layer 320. Alternatively or additionally, the second layer 320 may be rotated relative to the first layer 310. Rotating a portion may comprise rotating all the virtual items within the portion, i.e. 710s and 720 in the first layer 310 and optional virtual item 750 in the second layer 320. The apparatus 100 may be configured to receive an indication of an instruction from the user, i.e. a gesture using a finger 730 in the direction of the arrow 740, to change a position of the first portion relative to the second portion of the hovering field 300. For example, the instruction to change a position of the first portion relative to the second portion may comprise, for example, a hovering gesture such as a flick gesture, a push gesture, a drag gesture, a "like" gesture (e.g. a thumbs up), a "dislike" gesture (e.g. a thumbs down) or any other suitable gesture such as a combination thereof. Rotation of the first layer 310 may result in the example of FIG. 4c, where the virtual items 710s and 720 of the first layer 310 are rotated relative to the optional virtual item 750 of the second layer.

In an example embodiment, the apparatus 100 is configured to change the position of the first virtual item along a trajectory corresponding to a shape of the hovering field. For example, if the hovering field is a spherical hovering field, the position of a virtual item may be changed along a spherical trajectory. As another example, if the hovering field is an ellipsoid, the position of a virtual item may be changed along an elliptical trajectory.

In an example embodiment moving a virtual item and/or a portion may cause an action to be performed. The action may relate to the item of which the virtual item is representative and/or the portion. The action may comprise, for example, changing the status of the item (e.g. from public to private or vice versa), purchasing the item, or setting a rating for the item (e.g. liking or disliking the item) and/or the like.

According to an example embodiment, the hovering field at least partially encompasses a device such as the mobile computing device 200. In an example embodiment, the hovering field may completely encompass the mobile computing device 200. According to an example embodiment, a hovering field at least partially encompassing a device comprises at least one portion of the hovering field extending from a first side of the device to a second side of the device.

In an example embodiment, the hovering field is divided into layers based on a number of levels in a data structure comprised in the mobile computing device 200 or a server. For example, the number of layers may correspond to the number of levels in a hierarchical file structure. The hovering field may be divided into multiple layers based on the distance from a reference point for the hovering field such as a center point of a device. The apparatus 100 is configured to define a layer as a range of distances from a reference point of the hovering field. For example, a first layer may correspond to distances from 8 to 10 cm from the reference point for the hovering field, a second layer may correspond to distances from 6 to 7.9 cm from the reference point for the hovering field, and a third layer may correspond to distances from 4 to 5.9 cm from the reference point for the hovering field. In an example embodiment, the user may define the number of layers provided. It should be noted that in different embodiments different distances and/or a different number of layers may be provided.

As discussed above, the first portion of a hovering field may comprise a first layer and the second portion of a hovering field may comprise a second layer. In an example embodiment, the second layer is enclosed by the first layer. In an example embodiment, different layers correspond to different levels in a data structure. The order of the layers may or may not correspond to the order of the different levels in a data structure.

Figure 3C:
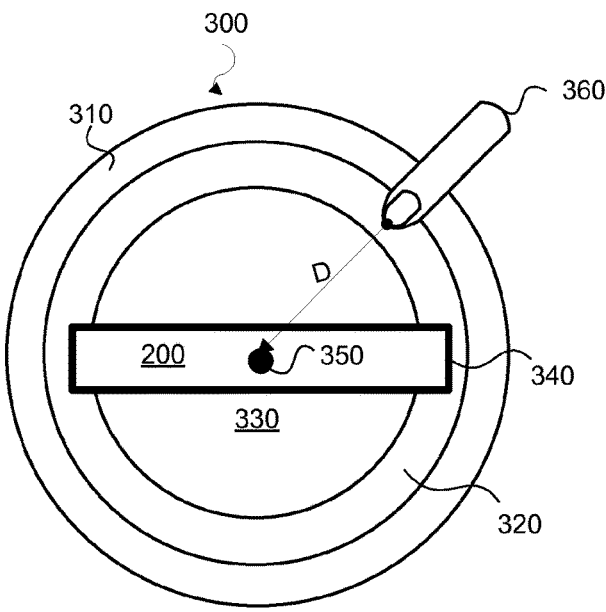

In the example of FIG. 3c, the reference point 350 for the hovering field is defined by the apparatus 100 as the center of the mobile computing device 200. In this example, the selecting object is a finger 360. The hovering field comprises a spherical hovering field 300 comprising a first layer 310, a second layer 320 and a third layer 330. The third layer is enclosed by the second layer 320 and the second layer 320 is enclosed by the first layer 310. The user may select the second layer, or an item associated with the layer, when the distance D between the finger 360 and the reference point for the hovering field 350 corresponds to a range of distances associated with the second layer. For example, if the second layer is defined as the range of distances from 6 to 7.9 cm from the reference point for the hovering field 350, and the distance D between the finger 360 and the center of the hovering field is 7 cm, it is interpreted by the apparatus 100 that the second layer, or an item associated with the layer, is selected by the user. A selection of a layer may be indicated by providing haptic feedback for the user.

In an example embodiment, the apparatus 100 is configured to maintain a layer selected even though the distance between the finger 360 and the center of the hovering field may change. For example, the apparatus 100 may be configured to maintain the layer selected during an operation relating to an item associated with the layer (e.g. during modifying a parameter relating to the item associated with the layer). The apparatus 100 may further be configured to release the layer in response to receiving an indication that the operation is finished. In this way, an unintentional selection of another layer may be avoided when performing the operation.

In an example embodiment, the apparatus 100 is configured to provide haptic, visual and/or audio feedback indicating a selected portion in the hovering field. The selected portion may comprise a portion with which an item is associated in the hovering field or a portion with which no item is associated. For example, the apparatus 100 may be configured to provide visual and/or haptic feedback indicating the selected portion. Visual feedback may comprise, for example, highlighting the selected portion, illuminating the selected portion, using different colors to indicate the selected portion or any combination thereof. A selected portion may be highlighted, illuminated or indicated using colors by means of highlighting, illuminating or indicating, on the touch screen display, one or more virtual items associated with the selected portion. In other words, the appearance of a virtual item within a portion may indicate to a user whether the portion is selected or not. Haptic feedback may comprise, for example, vibrotactile feedback, providing sensations of force and/or motion to the user or any combination thereof. For example, different tactile feedback may be provided such that in response to selecting a first portion, a first tactile pattern may be provided and in response to selecting a second portion, a second tactile pattern may be provided. As another example, if the selected portion comprises a layer, the number of feedback sequences may correspond to an ordinal number of the layer.

Without limiting the scope of the claims, providing feedback indicating a selected portion may assist a user in performing a selection process.

In addition to selecting a virtual item, the user may also perform other actions with the hovering field. According to an example embodiment, the hovering field as a whole or a portion of the hovering field may be rotatable. Rotating the hovering field may comprise rotating all the virtual items associated with one or more portions of the hovering field. Similarly, rotating a portion of the hovering field may comprise rotating all the virtual items associated with the portion. The apparatus 100 may be configured to rotate the hovering field or a portion of the hovering field in response to receiving an indication of a rotating input from the user. A first portion and a second portion of the hovering field may be individually rotatable. A portion of the hovering field may comprise, for example, a layer or a zone. The user input may comprise any suitable user input such as a hovering gesture input and/or a facial expression detected by a camera. Rotating a portion of the hovering field or the hovering field as a whole may or may not cause a corresponding movement of associated items stored in the mobile computing device 200/server.

Rotating the hovering field as a whole may comprise moving the virtual items associated with different portions of the hovering field relative to the mobile computing device 200. For example, rotating the hovering field as a whole may cause virtual items to move from the back of the mobile computing device 200 to the front of the mobile computing device.

Rotating a first portion may comprise moving at least one virtual item representative of a first item associated with the first portion, relative to a virtual item representative of a second item associated with a second portion. As another example, rotating a portion may comprise changing the position of a virtual representative of an item associated with a portion relative to the mobile computing device 200. For example, if the portion comprises a layer, rotating a first layer may cause one or more virtual items to move from the back of the mobile computing device 200 to the front of the mobile computing device 200. When a virtual item is in front of the mobile computing device 200, it may be selected via a touch screen display of the device. Selecting the item via the touch screen display may comprise selecting the item with a hovering gesture based on a distance between the selecting object and a reference point for the hovering field.

Figure 4A:
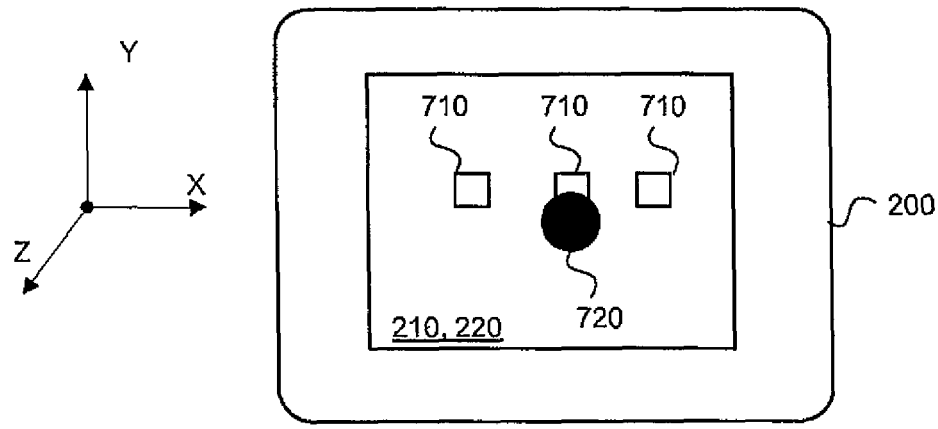
FIGS. 4a to 4c illustrates an example of rotating a layer in a spherical hovering field in accordance with an example embodiment of the invention.
Figure 4B:
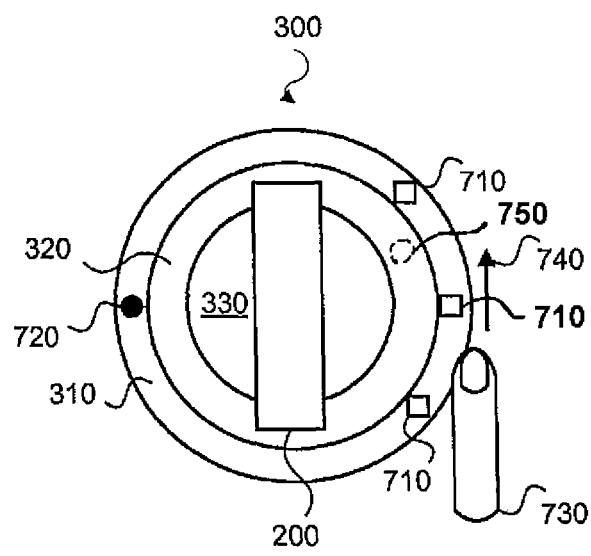
Figure 4C:
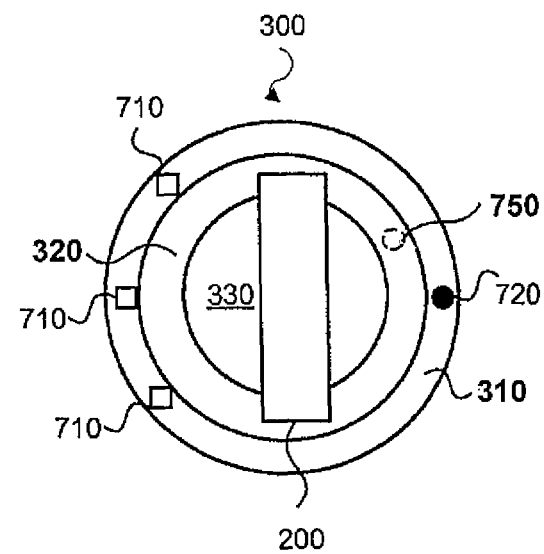

FIGS. 4a to 4c illustrate an example of rotating a layer in a spherical hovering field 300. In this example, the spherical hovering field 300 comprises three layers: a first layer 310, a second layer 320 and a third layer 330. The third layer 330 is enclosed by the second layer 320, and the second layer 320 is enclosed by the first layer 310. The first layer comprises four virtual items 710, 720. Further, the spherical hovering field 300 at least partially encompasses a mobile computing device 200. In this example, the mobile computing device 200 comprises an apparatus 100 and a touch screen display 210, 220 via which a user may select items. It is assumed that the center of the mobile computing device 200 is defined as a reference point for the spherical hovering field. In this example, the X axis is defined as being parallel to a first side of the mobile computing device 200, the Y axis is parallel to a second side of the mobile computing device 200 and the Z axis is perpendicular to the X and Y axes. A layer may be selected based on the distance between the finger 730 and the center of the mobile computing device 200.

FIG. 4a illustrates the relative positions of virtual items 710, 720 with respect to the touch screen display 210, 220. The virtual items 710 and 720 are representatives of items associated with different portions of a layer in a hovering field. Virtual items 710 are positioned along a negative portion of the Z axis and item 720 is positioned along a positive portion of the Z axis. In other words, items 710 may be considered as being "behind" the mobile computing device 200, whereas item 720 may be considered as being "in front of" the mobile computing device and directly selectable by the user via the touch screen display 20, 220.

FIG. 4b illustrates a user rotating a layer in the spherical hovering field 300. FIG. 4b corresponds to the situation of FIG. 4a: the virtual item 720 is illustrated in FIG. 4a as being located in the hovering field in front of the mobile computing device 200. Virtual items 710 are illustrated in FIG. 4a as being located in the hovering field behind the mobile computing device 200. In the example of FIG. 4b the user selects and rotates the first layer 310 such that the three virtual items 710 move from behind the mobile computing device 200 to the front of the mobile computing device. Further, the virtual item 720 moves from the front of the mobile computing device 200 to behind the device such that the relative positions of the virtual items 710, 720 are retained. The user may rotate the first layer 310 by a gesture, for example, in the direction of the arrow 740.

FIG. 4c illustrates the situation after rotating the first layer. The virtual items 710 are now illustrated as being in front of the mobile computing device 200 and the virtual item 720 is illustrated as being behind the mobile computing device 200. The user may now select an item of which the virtual item 710 is representative via the touch screen display 210, 220 based on the relative positions of the finger 730 and the center of the mobile computing device 200.

In an example embodiment, a mobile computing device 200 comprises an apparatus 100, a touch screen display on a first side of the mobile computing device 200 and a backside surface on a second side of the mobile computing device 200. The first side and the second side of the mobile computing device 200 are opposite to each other and within a distance from each other. The apparatus 100 is configured to interpret a hovering gesture detected at a distance from the first side of the mobile computing device 200 as a selecting input for selecting for selecting an item associated with a portion of the hovering field. According to an example embodiment, the apparatus 100 is further configured to interpret a hovering gesture detected at a distance from the second side of the mobile computing device 200 as a rotating input for rotating a portion of the hovering field such as a layer of the hovering field.

The apparatus 100 is configured to detect a rotating input. The apparatus 100 is configured to receive an indication of X, Y and Z coordinate data of the rotating input. In this example the user wishes to rotate a layer in a spherical hovering field. The apparatus 100 is configured to select a layer based on a distance between a rotating object and a reference point for the hovering field. A layer may be rotated by a tangential hovering gesture relative to a layer. For example, assuming the user rotates the layer on the second side of the mobile computing device 200 such that only X coordinate data of the selecting object changes (i.e. Y and Z coordinate data are constant), the selected layer is rotated by the apparatus 100 around Y axis. Assuming the user rotates the layer on the second side of the mobile computing device 200 such that only Y coordinate data of the selecting object changes (i.e. X and Z coordinate data are constant), the selected layer is rotated by the apparatus 100 around X axis. Assuming the user rotates the layer on the second side of the mobile computing device 200 such that both X and Y coordinate data of the selecting object changes (i.e. Z coordinate data is constant), the selected layer is rotated around both Y and X axes.

Figure 5:
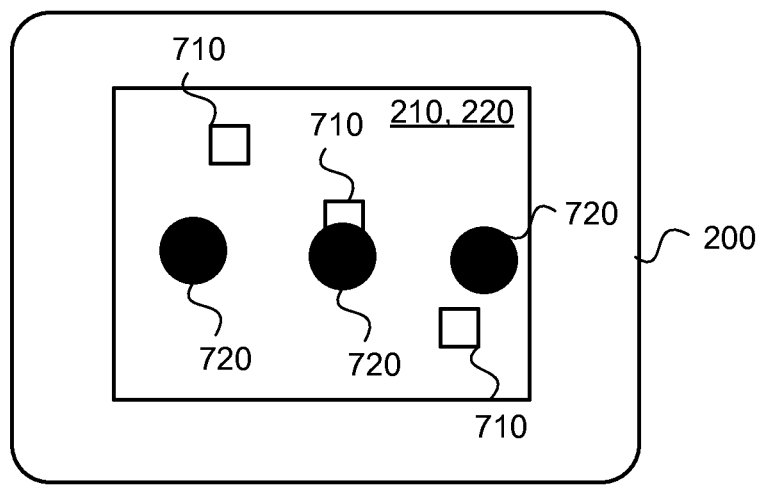
FIG. 5 illustrates an example of rotating a layer about two axes in accordance with an example embodiment of the invention.

According to an example embodiment, the apparatus 100 is configured to rotate a layer about at least two axes. FIG. 5 illustrates such a situation: virtual items 720 are organized horizontally on a first layer whereas virtual items 710 are organized on a second layer as having a 135 degrees angle compared to virtual items 720 on the first layer.

According to an example embodiment, the first portion comprises a first zone and the second portion comprises a second zone.

Figure 6:
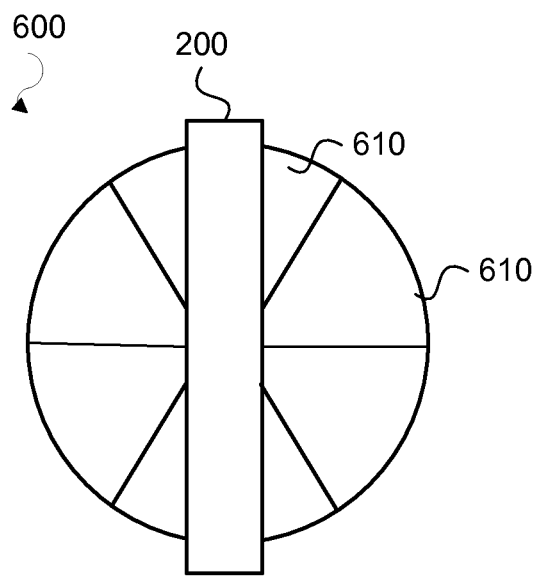
FIG. 6 illustrates rotating portions of a spherical hovering field based on facial expressions in accordance with an example embodiment of the invention.

FIG. 6 illustrates an example 600 of rotating portions of a spherical hovering field based on facial expressions. In the example of FIG. 6, the spherical hovering field comprises six zones 610. In this example, the mobile computing device 200 comprises an apparatus 100 and a camera. The apparatus 100 is configured to detect a user's facial expressions received via the camera. Each zone is associated with a facial expression. The facial expressions may comprise, for example, anger, joy, surprise, disgust, sadness, fear or any other suitable facial expressions. Further, one or more items are associated with a zone, the one or more items relating to the associated facial expression. For example, if a facial expression indicating sadness is associated with a zone, the items associated with the sadness zone are songs that comprise at least one characteristic related to sadness, melancholy and/or the like.

In an example embodiment, the apparatus 100 is configured to rotate the spherical hovering field such that the zone that corresponds to the user's facial expression is selectable by the user. A zone may be selected similarly to selecting an item. For example, a zone may be selected by a hovering gesture within a display area. Alternatively, a zone may be selected by a touch gesture on a touch screen display.

According to an example embodiment, the apparatus 100 is configured to cause capturing the user's facial expression using the camera in response to a trigger such as, for example, receiving an indication that the user picked the mobile computing device 200 up, receiving an indication that a user has moved the device, grabbed the device, or the like. In an example embodiment, the apparatus 100 may be configured to detect a change in the user's facial expression and cause rotating the items associated with the spherical hovering field. The user's facial expressions may be captured continuously or periodically, or only at one instant for example in immediate response to a trigger.

According to an example embodiment, a first mobile computing device 200 comprising the apparatus 100 may be configured to provide a first hovering field. The apparatus 100 included in the first mobile computing device 200 is configured to detect a hovering field provided by a second mobile computing device which at least partially overlaps with the first hovering field so as to produce an overlapping hovering field. An overlapping hovering field may comprise a portion of a first hovering field that is in common with a second hovering field. An overlapping hovering field may be detected by the apparatus 100 by detecting, using the first hovering field, that the second mobile computing device is in close proximity of the first mobile computing device 200. The apparatus 100 may also be configured to receive information about the properties of the second mobile computing device and/or the hovering field provided by the second mobile computing device from the second mobile computing device. An overlapping hovering field may be detected by the apparatus 100, by receiving an indication of an overlapping hovering field from a module, a chip or a chipset configured to communicate with the apparatus 100 or by receiving an indication of the overlap from an external device.

In an example embodiment, the apparatus 100 is configured to select a portion of the first hovering field in dependence on the magnitude of the overlap. For example, if the hovering field comprises a first layer and a second layer wherein the second layer is enclosed by the first layer, the apparatus 100 may detect or receive an indication that a further hovering field overlaps with the first layer. The further hovering field may be provided by a separate apparatus that is independent of the apparatus 100. The magnitude of the overlap may be indicated to the user of either the first mobile computing device 200, the second mobile computing device or both by providing, for example, haptic feedback.

According to an example embodiment, the apparatus 100 is configured to share an item stored in the mobile computing device 200/server with a device causing an overlapping hovering field.

Figure 7:
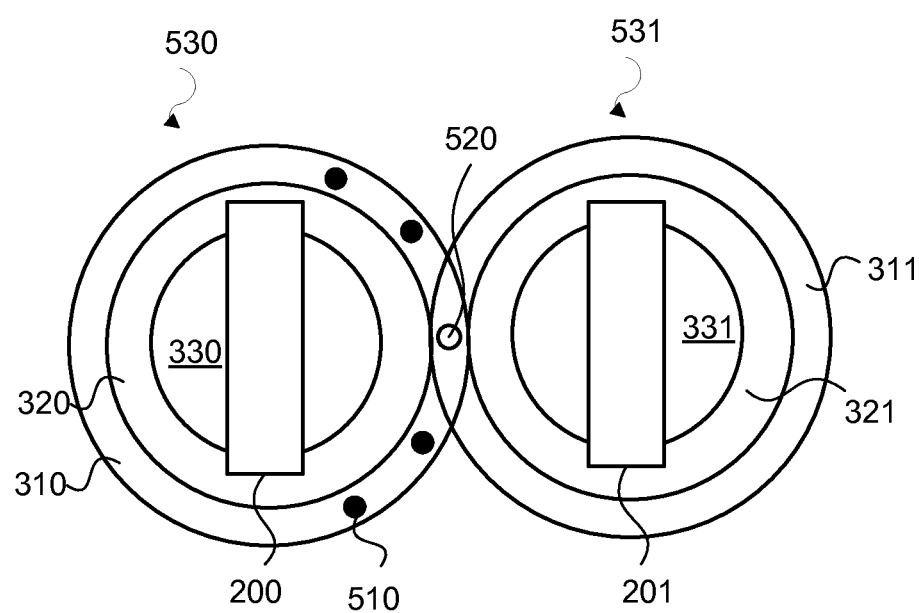
FIG. 7 illustrates an example of sharing an item based on overlapping hovering layers in accordance with an example embodiment of the invention.

FIG. 7 illustrates an example of sharing an item stored in the sending mobile computing device 200 based on overlapping hovering layers between the sending mobile computing device 200 and a receiving mobile computing device 201. Sharing an item may comprise sending, transferring, transmitting, copying or moving the item from the sending mobile computing device 200 to the receiving mobile computing device 201. In this example, it is assumed that both the sending mobile computing device 200 and the receiving mobile computing device 201 comprise an apparatus 100. In the example of FIG. 7, the sending mobile computing device 200 is configured to provide a first spherical hovering field 530 at least partially encompassing the sending mobile computing device 200. The first spherical hovering field 530 comprises three layers 310, 320, 330. A first layer 310 encloses a second layer 320 which encloses a third layer 330. Further, items 510, 520 are associated with a first layer 310. The receiving mobile computing device 201 is configured to provide a second spherical hovering field 531 at least partially encompassing the second mobile computing device 201. The second spherical hovering field 531 comprises three layers 311, 321, 331. A first layer 311 encloses a second layer 321 which encloses a third layer 331.

In an example embodiment, the apparatus 100 included in the sending mobile computing device 200 is configured to detect that the receiving mobile computing device 201 is within a threshold distance from the sending mobile computing device 200. Detecting that the receiving mobile computing device 201 is within the threshold distance may be based on detecting the receiving mobile computing device 201 within the hovering field 530 provided by the sending mobile computing device 200, based on overlapping spherical hovering fields 530 and 531 or based on a communication between the devices 200 and 201. Detection by a hovering field may be based on information received from a hover sensor, a camera or any combination thereof.

The apparatus 100 of the sending mobile computing device 200 may further be configured to determine overlapping layers of a plurality of overlapping hovering fields and select at least one layer based on a degree of overlap. The degree of overlap may comprise, for example, a number of layers that overlap each other. As mentioned above, haptic feedback may be provided by the apparatus 100 of the sending mobile computing device 200 to indicate the selected layer to the user. Haptic feedback may also be provided upon detecting a change in the degree of the overlap.

In the example of FIG. 7, the first spherical hovering field 530 comprising virtual items 510, 520 overlaps with the second spherical hovering field 531 such that one virtual item 520 is comprised by the portion that is in common with the first 530 and second 531 spherical hovering field. The apparatus 100 of the sending mobile computing device 200 is configured to determine that the item of which a virtual item is representative is to be shared based on the overlapping portion between a first spherical hovering field and a second spherical hovering field.

Sharing may be initiated, for example, after the mobile devices 200 and 201 have remained within a predefined distance and/or in an overlapping position for a predefined period of time. The period of time may comprise, for example, 1, 2, 3, 4 or 5 seconds, or 2 to 10 seconds. The sharing may be performed over a radio communication link such as using Bluetooth, WiFi or near field communication (NFC) technology. In this example, sharing comprises sending a copy of the item of which the virtual item 520 is representative from the sending mobile computing device 200 to the receiving mobile computing device 201. The apparatus 100 of the receiving mobile computing device 201 may be configured to acknowledge the received item with a sound or a vibrotactile feedback. In this way, the receiving person knows that the sharing is completed.

The apparatus 100 of the sending device 200 or the receiving device 201 or both, may further be configured to select at least one additional virtual item in response to a user action. The user action may comprise, for example, tilting, shaking, turning or performing a gesture with or on the sending mobile computing device 200 or the receiving mobile computing device 201. For example, if the first virtual item is selected based on overlapping layers, tilting the mobile device 200/201 to the left may cause selecting one or more virtual items on the left of the selected item. Similarly, tilting the mobile computing device 200/201 to the right may cause selecting one or more virtual items on the right of the selected virtual item. In some examples, tilting the mobile computing device 200/201 may cause selecting one or more virtual items independent of the direction of tilting.

The apparatus 100 may be configured to select the at least one additional virtual item in dependence on a location and/or a type of the first virtual item. For example, the at least one additional virtual item may be selected in the same layer as the first virtual item. As another example, the at least one additional virtual item may be selected based on a relation between the first virtual item and the virtual second item. In this example, the at least one additional virtual item may be included in a different layer than the first virtual item. For example, if the first virtual item represents a music album associated with a first layer, the at least one related virtual item may be associated with a second layer and comprise representation of a song included in the music album.

In an example embodiment, the apparatus 100 is configured to select multiple virtual items in response to receiving an indication that a range of layers are overlapping with the hovering field of the receiving mobile computing device 200. The apparatus 100 may be configured to detect a change in the degree of overlapping of layers. For example, the apparatus 100 may detect that first the number of overlapping layers is one, then two and then three. Hence, virtual items from three layers may be selected. In an example embodiment, the apparatus 100 is configured to receive a user input to enable selecting a range of layers.

According to an example embodiment, a user profile may be utilized for selecting and/or recommending items to be shared. For example, the apparatus 100 of the sending mobile computing device 200 may be configured to detect user behavior and cause storing of music listening history, preferences, social network activity and/or the like. Further, the apparatus 100 may be configured to create a user profile based on the detected user behavior. This information may be used to predict which items the user most probably wishes to share.

In an example embodiment, the apparatus 100 is configured to automatically rotate a layer comprising items that the user most probably wishes to share. This may comprise, for example, rotating the layer so that as little overlapping of spherical hovering fields as possible is needed to select the virtual items. In an example embodiment, the apparatus 100 is configured to provide feedback indicating that the receiving device or the hovering field provided by the receiving device is approaching a virtual item representative of content on the sending device that is detected as likely to be shared. The apparatus 100 may be configured to provide different levels and/or styles of feedback in dependence on the probability of the item to be likely shared.

According to an example embodiment, the spherical hovering field comprises a visible hovering field. A visible hovering field may be created, for example, by suitably illuminating the hovering field, for example, by LEDs incorporated with the mobile computing device 200.

Figure 8:
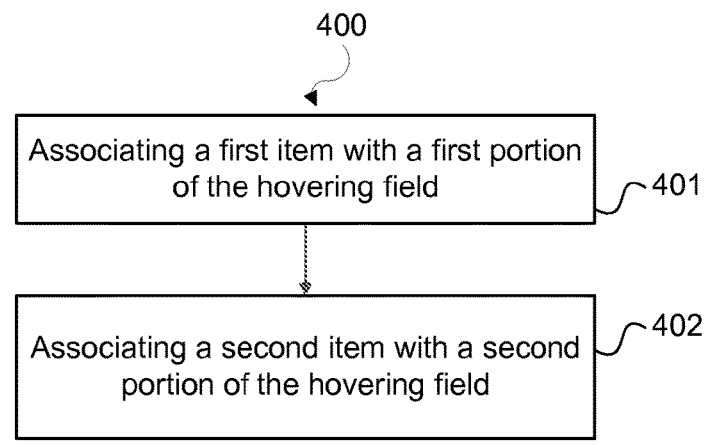
FIG. 8 illustrates an example method incorporating aspects of example embodiments of the invention.

FIG. 8 illustrates an example method 400 incorporating aspects of the previously disclosed embodiments. In this example it is assumed that the method is implemented in the mobile computing device 200. More specifically the example method 400 illustrates associating items with portions of a hovering field.

The method starts with associating 401 associating a first item with a first portion of a hovering field. The hovering field may at least partially encompass a device. The device may be, for example, a mobile computing device 200.

At block 402, the method continues with associating a second item with a second portion of the hovering field. The relative positions of the first portion and the second portion may correspond to the relative positions of the first item and the second item in a data structure. The data structure may be comprised by a mobile computing device 200 or a server.

Reference will now be made to a further example embodiment in which an apparatus 100 is configured to associate a first item stored in a mobile computing device/server with a first portion of a hovering field, the hovering field at least partially encompassing a device such as a mobile computing device. In this example, the apparatus 100 is further configured to control spatial audio field such as surround sound field in dependence of a position of a virtual item representative of the first item associated with the first portion in the hovering field. Spatial audio field may be created by a surround sound system surrounding a listener. A surround sound system may comprise multiple loudspeakers through which multiple discrete audio channels are routed. As another example, an illusion of a spatial audio field may be created by headphones.

According to an example embodiment, the reference point for the hovering field corresponds to the center point of a spatial audio field around a user (e.g. 360 degree audio field around the user). In other words, the apparatus 100 is configured to define that the user's position corresponds to a reference point of the hovering field such as a center of a spherical hovering field. Further, the reference point of the hovering field may correspond to the center of the audio field. For example, the user may be sitting on a sofa and the mobile computing device 200 may be connected to an external surround capable system providing a spatial audio field. As another example, the user may be listening to audio via headphones and the mobile computing device 200 may use, for example, binaural audio rendering methods to create an illusion of a spatial audio field surrounding the user.

Without limiting the scope of the claims, a reference point of a hovering field corresponding to the position of the user and the center of the spatial audio field may enable a user to intuitively control, using the hovering field, spatial audio around him. A user may see a hovering field as a metaphor corresponding to, for example, his immediate surroundings, or the globe, and can organize items in the hovering field accordingly.

According to an example embodiment, the first virtual item comprises an audio item representing audio. The apparatus 100 is configured to detect the position of the audio item relative to the user and cause selecting a first loudspeaker in dependence on the detected position. The apparatus is further configured to cause routing the audio represented by the audio item through the first loudspeaker.

Figure 9A:
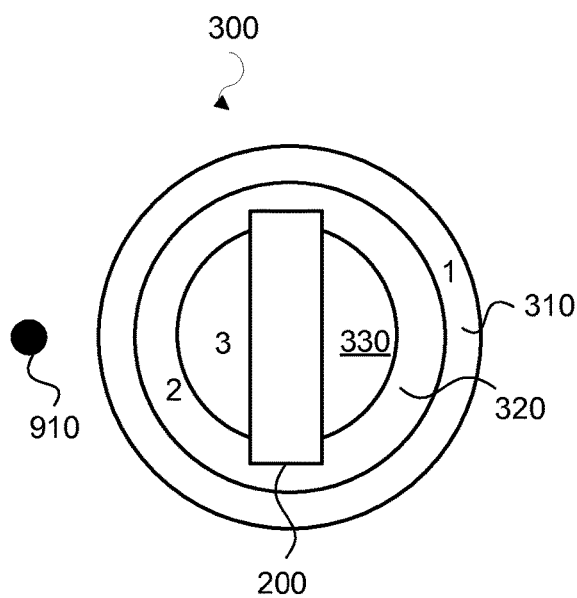
FIGS. 9a and 9b illustrate an example of a spherical hovering field that corresponds to a 360 degree spatial audio field around the user in accordance with an example embodiment of the invention.
Figure 9B:
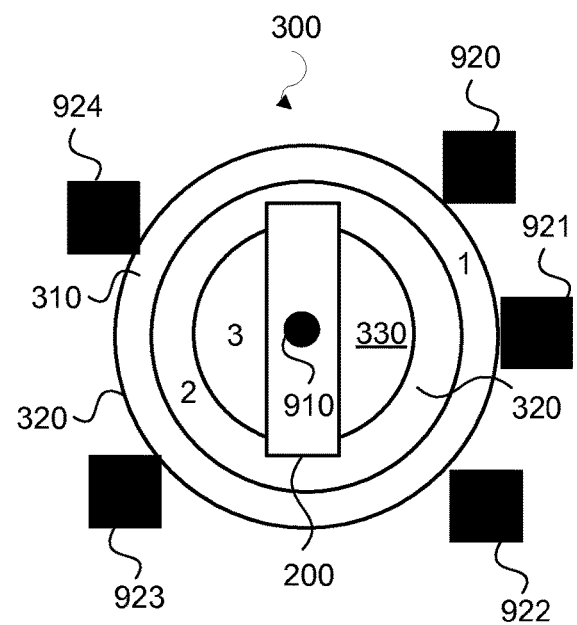

FIGS. 9a and 9b illustrate a spherical hovering field that corresponds to a 360 degree spatial audio field around the user.

FIG. 9a illustrates an example, where a user 910 faces the mobile computing device 200. The spherical hovering field comprises a first layer 310, a second layer 320 and a third layer 330 at least partially encompassing a mobile computing device 200. A portion of the first layer 310 corresponds to a first audio track 1 of a song, a portion of the second layer 320 corresponds to a second audio track 2 of the song and a portion of the third layer corresponds to a third audio track 3 of the song.

FIG. 9b illustrates an example, where the spatial audio field is provided by loudspeakers 920, 921, 922, 923 and 924 around the user 910. The reference point of the hovering field corresponds to the center of the spatial audio field. Since the user's position is defined to correspond to the reference point of the hovering field, and the reference point for the hovering field corresponds to the center point of the spatial audio field, the user's position is regarded by the apparatus 100 as the center of the spatial audio field. The apparatus 100 is configured to detect a position of an audio track relative to the reference point of the hovering field, and cause routing the audio track through a corresponding loudspeaker. In the example of FIG. 9b, the apparatus 100 is configured to route the first audio track 1 through loudspeakers 920 and 921, the second audio track 2 through loudspeaker 923 and the third audio track 3 through 923 and 924.

According to an example embodiment, the apparatus 100 is configured to re-position the audio item and cause re-routing the audio represented by the audio item through a second loudspeaker. The apparatus 100 may be configured to receive an indication of a user input for re-positioning the audio item. Re-positioning may comprise changing the position of the audio item within the hovering field. In this way, the user may control the spatial audio field around him by moving audio items representing audio within a hovering field and define through which loudspeakers audio is routed.

Re-routing audio may be triggered by rotating a rotatable layer. For example, a user may hear a sound source A from a first direction and a sound source B from a second direction. With rotating the layer with two fingers the user may switch the positions of the sound sources with a single action. A two finger gesture may be used to make a distinction with a hovering gesture for selecting an item, which may be made with one finger. For example, the user may rotate the sound source A to come from the second direction and sound source B to come from the first direction, or any other appropriate location around the user. It should be noted that the user may also use some other gesture than a two finger gesture. For example, the user may use a gesture with more or less fingers or the user may define the gesture himself.

The hovering field may comprise a first audio attribute associated with a first layer and a second audio attribute associated with a second layer. For example, a first layer and a second layer may have a first volume level and a second volume level, respectively. The apparatus 100 may be configured to adjust an audio attribute in response to a hovering input from the user. For example, the apparatus 100 may be configured to increase the volume level of a layer or an audio object associated with a layer in response to receiving an indication of a hovering input over the layer or the audio object, respectively. The hovering input over the layer or an audio object may comprise for example, hovering along the layer, parallel to the layer, perpendicular to the layer, a series of hovering gestures or the like.

As another example, the apparatus 100 may be configured to control the volume level of an audio object in response to detecting that a representation of the audio object is moved from the first layer to the second layer. For example, if the representation of the audio object is moved to a second layer that is farther away from the reference point of the hovering field, the volume of the object may be decreased. On the other hand, if the audio object is moved to a second layer that is closer to the reference point of the hovering field, the volume of the audio object may be increased.

The apparatus 100 is configured to associate an audio parameter with a first portion of the hovering field. A value of the audio parameter associated with the first portion of the hovering field may be adjusted by selecting the item by the user and adjusting the audio parameter with a hovering gesture. The hovering gesture may comprise, for example, movement and the parameter value may be controlled by the amount of movement. As another example, the amount of the parameter adjustment may be predefined.

The apparatus 100 may further be configured to adjust the audio parameter in response to rotating the layer. The layer may be rotated, for example, in response to a user input. According to an example embodiment, multiple audio parameters may be associated with a layer. The apparatus 100 is configured to receive an indication of a selected layer and an indication of direction of movement related to the layer. A parameter value associated with a layer may be adjusted, for example, by the amount of detected movement. Hence, a user may adjust the multiple audio parameters with a single user input.

In an example embodiment, the apparatus 100 is configured to select multiple layers and control parameter values associated with them concurrently. The apparatus 100 is configured to adjust a first parameter value associated with a first layer by a first gesture and a second parameter associated with a second layer by a second gesture. The first and second gesture may be performed respectively at a first distance and a second distance from a reference point of the hovering field. The first and the second parameter values may be adjusted in dependence of a direction of movement of the first and the second gestures, respectively. For example, the amount of adjusting may correspond to the amount of movement of the gestures.

For example, items representing ten singers forming ten audio tracks may be associated with a first layer such that they are evenly or non-evenly distributed in a spatial audio field. Volumes of the singers and their individual balances may be associated with a second layer. By selecting both the first layer and the second layer the user may adjust the spatial positions of all the singers with a first hovering gesture and concurrently control the volumes of all the ten audio tracks, maintaining the volume balance, with a second hovering gesture. If the user decides not to continue with the second gesture, but only continue with the first gesture, the user may continue with solely controlling the spatial position of the singers. Therefore, each layer may be controlled individually with a single gesture.

In case the apparatus 100 or the mobile computing device 200 does not support detecting concurrent hovering gestures, a user may still have an option to select multiple layers by selecting virtual items associated with the layers, for example on a touch screen of the mobile computing device 200. Parameter values for the items associated with the layers may be adjusted by a hovering gesture at a distance from the reference point of the hovering field.

In an example embodiment, the audio parameter comprises an audio equalizer (EQ) setting and the hovering field may be used for controlling audio equalizer (EQ) settings. In general, an audio equalizer may be used for altering the frequency response of an audio system using linear filters.

In terms of controlling an audio equalizer setting, a hovering field may be used for controlling, for example, a Q value that controls the number of frequencies that will be cut or boosted by the audio equalizer. The lower the Q value, the more frequencies will be affected. Similarly, the higher the Q value, the fewer frequencies will be affected. For example, the user may have associated multiple different Q values with a specific layer. With a single action, the user can concurrently increase and decrease the Q values.

Figures 10A, 10B:
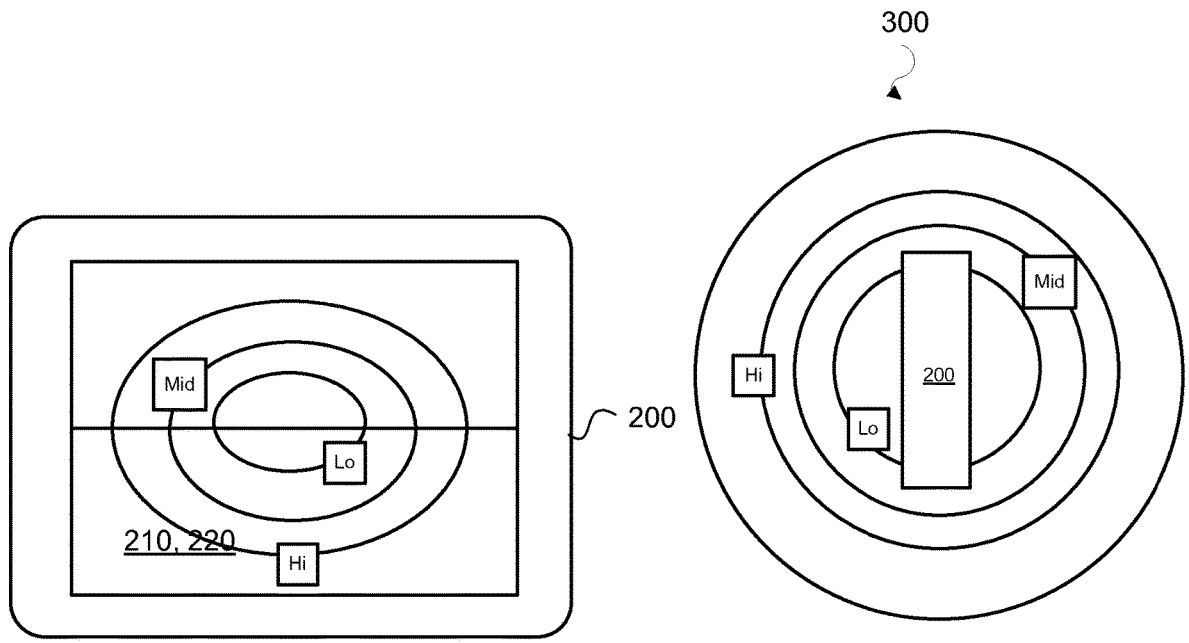
FIGS. 10a and 10b illustrates an example of an audio equalizer controller in accordance with an example embodiment of the invention.

FIGS. 10a and 10b illustrate an example of an audio equalizer controller. FIG. 10a illustrates a front view of the mobile computing device 200 and FIG. 10b illustrates a side view of the mobile computing device 200. In the example of FIG. 10a, the audio equalizer controller is implemented in a mobile computing device 200 comprising an apparatus 100 and a touch screen display 210, 220. The audio equalizer controller comprises a three-band (low (Lo), mid (Mid) and high (Hi) bands) equalizer controller integrated into a music player. In this example, the front part of the audio equalizer (closest to the user facing the device) is the maximum setting for a parameter. Correspondingly, the back part of the audio equalizer (farthest from the user) is the minimum setting for a parameter.

In the example of FIG. 10b, a spherical hovering field 300 encloses the mobile computing device 200. The apparatus 100 is configured to receive an indication of a layer selected by a user. The apparatus 100 is further configured to determine an effect parameter associated with the layer and adjust the effect parameter value in dependence of the hovering gesture. The effect parameter value may be adjusted, for example, by a predetermined amount to the direction defined by the direction of the hovering gesture.

Audio effects may include, for example, spatial audio position, volume, echo, flanger, phaser, chorus, equalization, filtering, overdrive, pitch shift, time stretching, resonators, robotic voice effects, modulation, compression or reverse echo.

Figure 11:
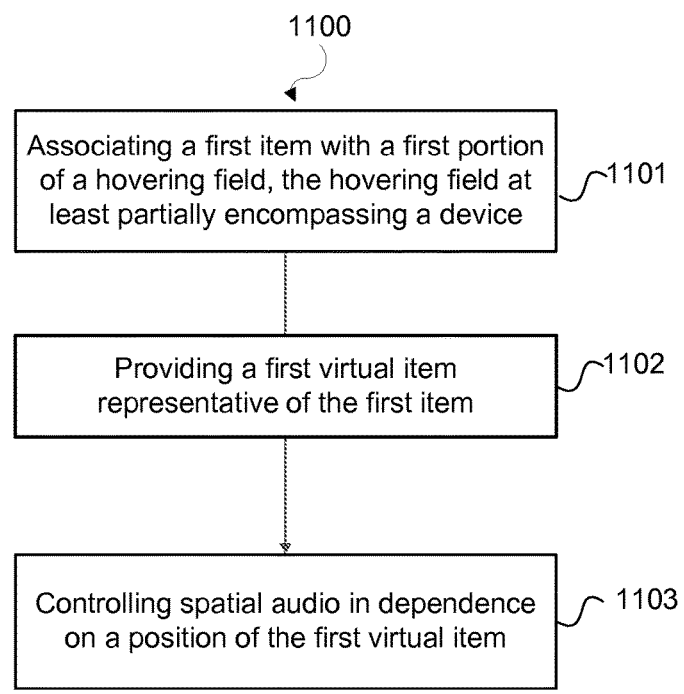
FIG. 11 illustrates another example method incorporating aspects of example embodiments of the invention.

FIG. 11 illustrates another example method 1100 incorporating aspects of the previously disclosed embodiments. In this example it is assumed that the method is implemented in the mobile computing device 200. More specifically the example method 1100 illustrates associating an audio parameter with a first portion of the hovering field.

The method starts with associating 1101 a first item with a first portion of a hovering field The hovering field may at least partially encompass the mobile computing device 200.

At block 1102 a first virtual item representative of the first item is provided.

At block 1103, the method continues with controlling spatial audio in dependence on a position of the first virtual item.

Without in any way limiting the scope, interpretation, or application of the claims appearing below, a technical effect of one or more of the example embodiments disclosed herein may be that a shape of a hovering field may be defined by appropriately selecting one or more center points of the hovering field. Another technical effect is that complex data structures may be spatially expanded such that a user does not need to select an item through complex menu structures. Yet another technical effect is that spatial audio may be controlled or parameter values may be adjusted using a hovering field.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
associating a first item with a first portion that comprises a rotatable layer of multiple rotatable layers of a hovering field based on a distance from a reference point associated with a device, the hovering field at least partially encompassing the device and enclosing at least a center point of the device in a three dimensional area, wherein the first item comprises an item stored in an associated storage device;
providing a first virtual item representative of the first item;
in response to rotating the first portion, moving the first virtual item relative to at least one other virtual item associated with at least one other portion of the hovering field;
determining spatial audio based on positioning at least one sound object in a three dimensional space in response to rotating the first portion; and
controlling the spatial audio in dependence on a position of the first virtual item relative to the at least one other virtual item, where the controlling comprises passing the at least one sound object through a sound rendering system and rendering the at least one sound object through multiple transducers distributed around the three dimensional space.

2. The method according to claim 1, further comprising detecting the position of the at least one sound object relative to a user and selecting a first loudspeaker in dependence on the detected position.

3. The method according to claim 2, comprising causing routing of audio represented with the at least one sound object through the first loudspeaker.

4. The method according to claim 3, further comprising re-positioning the at least one sound object, wherein re-positioning the at least one sound object causes re-routing the audio represented with the at least one sound object through a second loudspeaker.

5. The method according to claim 2, wherein detecting the position further comprises:
detecting the position based on one of a camera or a hover sensor.

6. The method according to claim 1, further comprising associating an audio parameter with the first portion of the hovering field; and
adjusting the audio parameter in response to rotating the first portion.

7. The method according to claim 6, wherein the audio parameter comprises an audio equalizer setting.

8. The method according to claim 1, wherein the hovering field comprises one of a spherical hovering field or an elliptical hovering field and rotating the first portion comprises changing a position of the first virtual item along a trajectory corresponding to a shape of the hovering field.

9. The method according to claim 1, wherein the hovering field at least partially encompassing the device comprises at least one portion of the hovering field extending from a first side of the device to a second side of the device.

10. The method according to claim 1, further comprising:
sharing the first item stored in the device with a receiving device based on overlap between at least one rotatable layer of the hovering field and another hovering field of the receiving device.

11. An apparatus comprising:
at least one processor; and
at least one non-transitory memory including computer program code the at least one non-transitory memory and the computer program code configured to, with the at least one processor, cause the apparatus to perform at least the following:
associate a first item with a first portion that comprises a rotatable layer of multiple rotatable layers of a hovering field based on a distance from a reference point associated with a device, the hovering field at least partially encompassing the device and enclosing at least a center point of the device in a three dimensional area, wherein the first item comprises an item stored in an associated storage device;
provide a first virtual item representative of the first item;
in response to rotating the first portion, move the first virtual item relative to at least one other virtual item associated with at least one other portion of the hovering field;
determine spatial audio based on positioning at least one sound object in a three dimensional space in response to rotating the first portion; and
control the spatial audio in dependence on a position of the first virtual item relative to the at least one other virtual item, where controlling comprises passing the at least one sound object through a sound rendering system and rendering the at least one sound object through multiple transducers distributed around the three dimensional space.

12. A computer program product comprising a non-transitory computer-readable medium bearing computer program code embodied therein for use with a computer, the computer program code comprising:
code for associating a first item with a first portion that comprises a rotatable layer of multiple rotatable layers of a hovering field based on a distance from a reference point associated with a device, the hovering field at least partially encompassing the device and enclosing at least a center point of the device in a three dimensional area, wherein the first item comprises an item stored in an associated storage device;
code for providing a first virtual item representative of the first item;
code for, in response to rotating the first portion, moving the first virtual item relative to at least one other virtual item associated with at least one other portion of the hovering field;
code for determining spatial audio based on positioning at least one sound object in a three dimensional space in response to rotating the first portion; and
code for controlling the spatial audio in dependence on a position of the first virtual item relative to the at least one other virtual item, where the controlling comprises passing the at least one sound object through a sound rendering system and rendering the at least one sound object through multiple transducers distributed around the three dimensional space.

* * * * *